Patented Feb. 27, 1923.

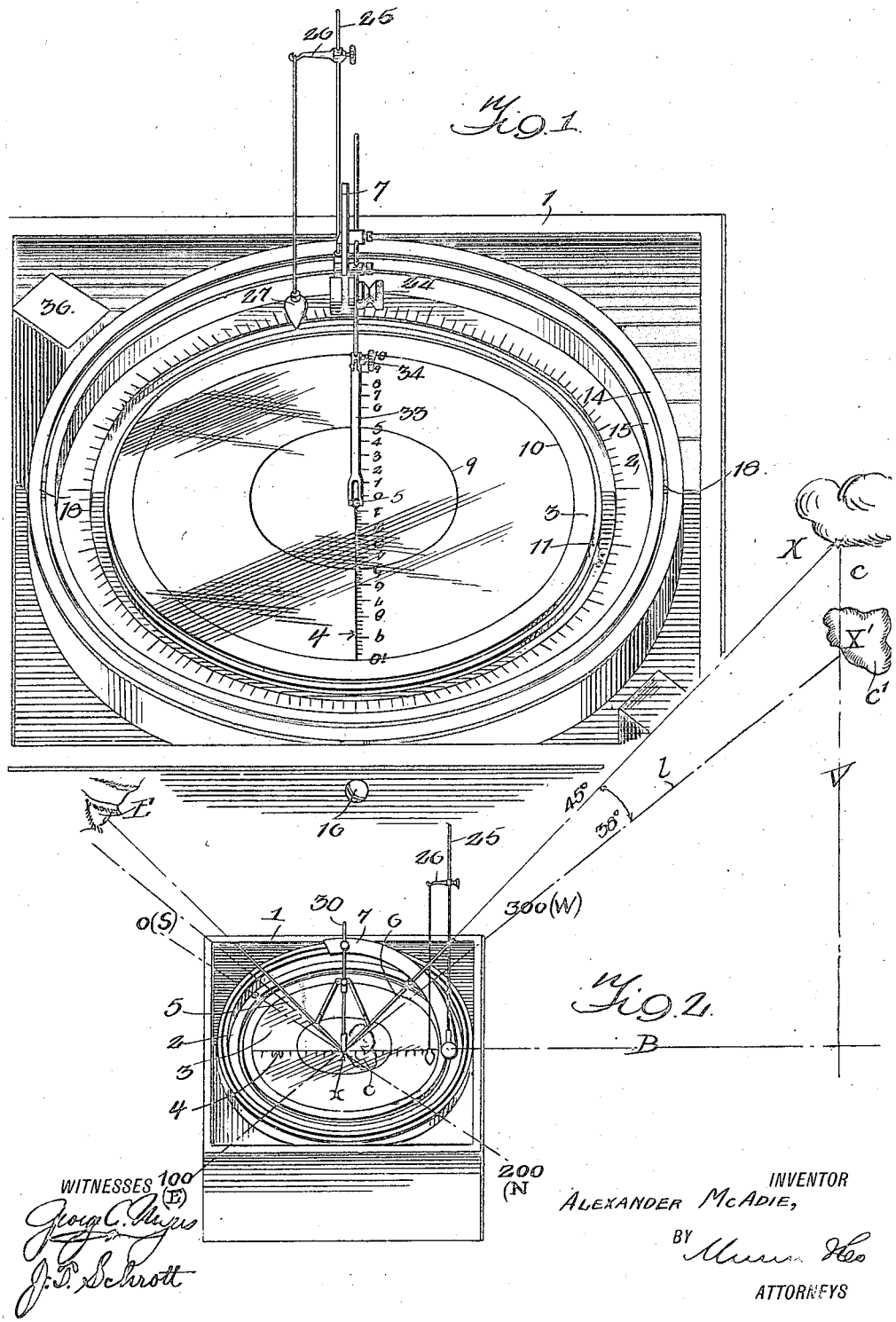

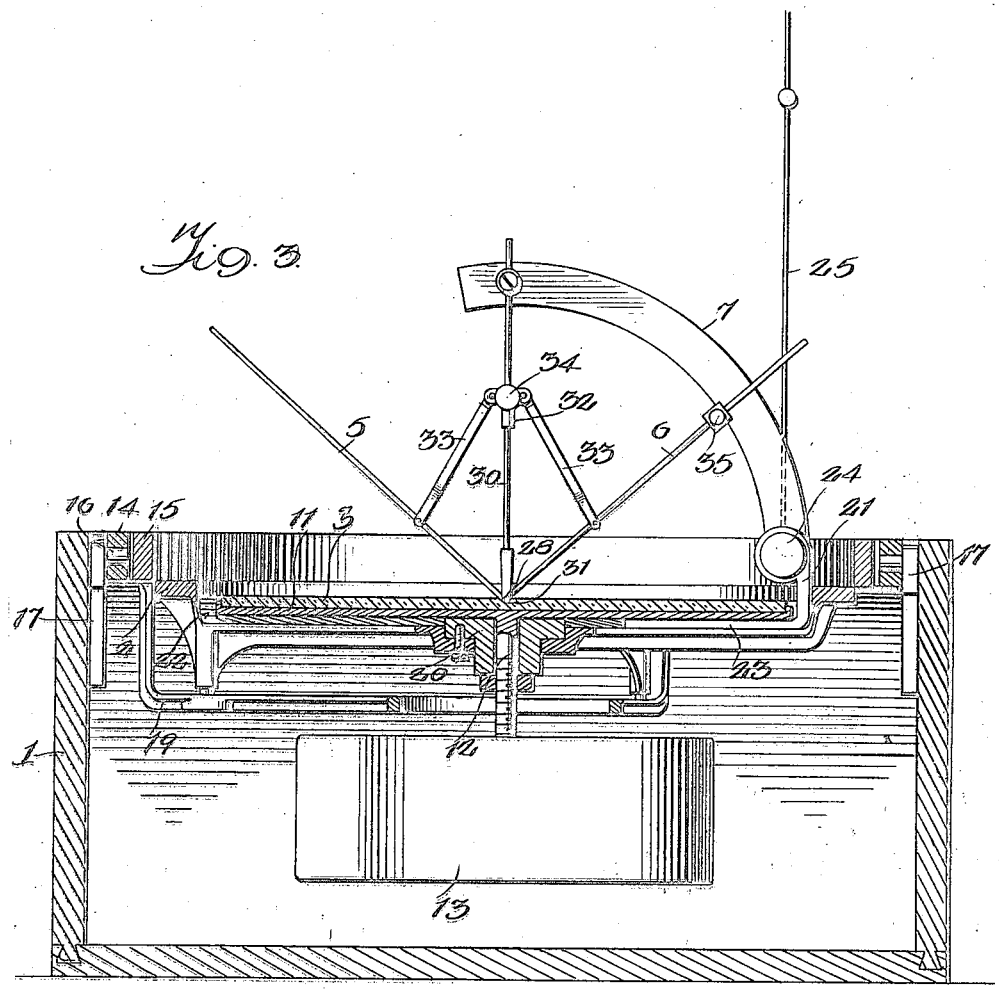

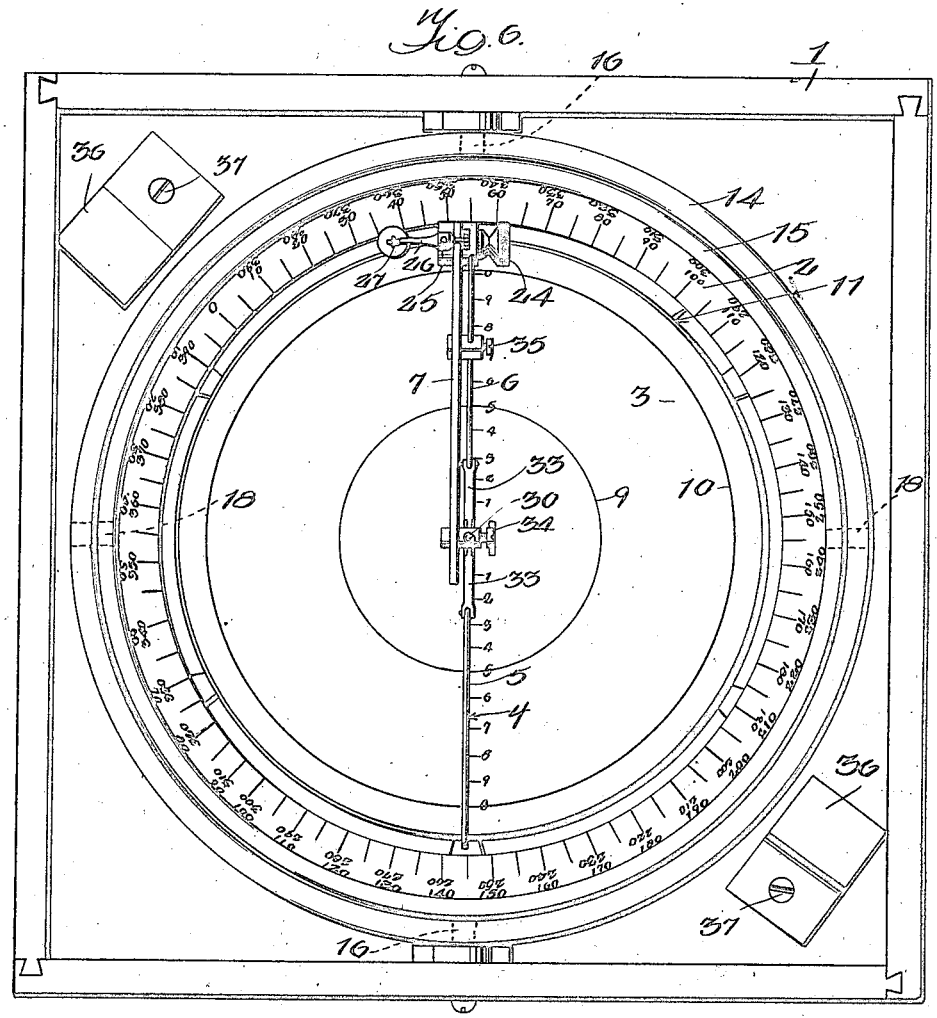
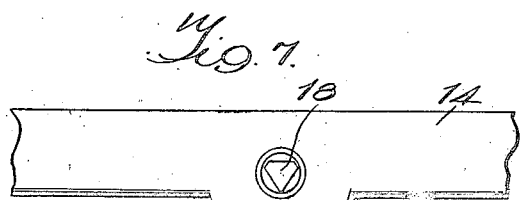

1,446,574

UNITED STATES PATENT OFFICE.

ALEXANDER McADIE, OF MILTON, MASSACHUSETTS.

NEPHOSCOPE.

Application filed May 19, 1921. Serial No. 470,930.

*To all whom it may concern:*

Be it known that I, ALEXANDER MCADIE, a citizen of the United States, and a resident of Milton, in the county of Norfolk and State of Massachusetts, have invented certain new and useful Improvements in Nephoscopes, of which the following is a specification.

My invention relates to improvements in nephoscopes, and it consists in the constructions, combinations and mode of operation herein described and claimed.

One of the foremost objects of the invention is to provide an instrument for facilitating the measuring of the velocity of cloud travel and designating the direction of such travel at sea or elsewhere.

Other objects and advantages will appear in the following specification, reference being had to the accompanying drawings, in which:—

Figure 1 is a perspective view of the improved nephoscope, showing how the instrument appears when sighting along the secondary sighting rod, Figure 2 is a diagrammatic perspective view which is more fully described in connection with certain calculations carried out below, Figure 3 is a cross section of the nephoscope, Figure 4 is a detail perspective view of the quadrant with its primary and secondary sighting rods, Figure 5 is a detail perspective view illustrating the construction and how the sighting rods are connected to the central standard, Figure 6 is a plan view of the nephoscope, Figure 7 is a detail side elevation illustrating the knife-edge mounting of the inner ring on the outer ring, and Figure 8 is a detail plan view, generally illustrating the construction in Figure 7.

*The mode of operation* is best explained in connection with diagrammatic Figure 2 which is intended to illustrate how the nephoscope is used. Certain details of construction are necessarily involved in this description of the operation, but a more complete description of the construction of the implement appears below under the heading "detailed construction of the nephoscope."

The nephoscope is used principally to determine the following: (1) determine the horizontal distance B of the cloud C from the nephoscope 1; (2) calculate the velocity of the cloud in meters per second, and (3) indicate the direction of travel of the cloud. The observer should preferably select a cloud 45° from the zenith for the purposes of his observation.

Place the box 1 so that "0" on the compass scale 2 is due south. The scale is divided into 400 degrees (according to the French method) instead of 360 degrees, and therefore each quarter contains 100 degrees. "100" therefore corresponds to "E" on the ordinary compass, "200" to "N," "300" to "W" and "0" or "400" to "S."

Look into the mirror 3 and bring the conspicuous point X of the cloud C to the center $x$. Observe the travel of the cloud image $c$ across the mirror, then turn the mirror until the line 4 coincides with the path of the image.

When the observer finds that he has the line 4 in the right position, he adjusts the secondary sighting rod 5 so as to bring it and the point $x$ in line with his eye E. A slight shifting of his position may be necessary in order to bring the conspicuous point X on the cloud C, back to the point $x$ on the mirror 3, because the cloud image $c$ will have advanced slightly across the mirror during the adjustment of the line 4 in obtaining the direction of travel.

Adjustment of the secondary sighting rod 5 will result in a corresponding movement of the primary sighting rod 6 over the quadrant 7 which is graduated on the side opposite the observer in Figure 2 in the natural tangents of the angles of the primary sighting rod 6 with the mirror 3. These graduations are shown in Figure 4. Should the vernier 8 register with the graduation "1.0" it will indicate that the sighting rod 6 is precisely at 45° with the plane of the mirror 3, or in other words, the sine and cosine are equal.

One element requires explanation before the first calculation can be made. It is necessary to know the vertical height V as a prerequisite. This vertical height may be ascertained by any known means; assume the vertical distance V to be 3000 meters.

Calculation (1) consists of dividing the known distance V by the tangent scale reading, or 3000 divided by 1.0 equals 3000 meters, the horizontal distance B from the center $x$ of the nephoscope to a perpendicular from the point X on the cloud.

Take another example: Suppose the cloud C to be at a lower elevation and the angle is now 38° instead of 45°. The observer must adjust the siding rods 5 and 6 lower, so that the rod 6 for example now coincides with the dotted line $l$, which line represents a line of sight from the center $x$ to a point X′ on cloud C′ corresponding to X on the cloud C.

Assume that the tangent scale reading (see Fig. 4) is now 0.8. The altitude of the cloud is known—having been determined by any one of the various means now employed at observatories, such for example as the use of balloons, a base line and two theodolites, pilot balloons and one theodolite, smoke trails (known abroad as shell bursts) dew-point values, etc.—the base B of the triangle will be this known distance divided by the tangent reading, in this case 2400 meters divided by 0.8 or 3000 meters.

Calculation (2) is to determine the velocity of the cloud in meters per second. A stop watch is needed. If the cloud C is 3000 meters away along the horizontal distance B (according to the first example in calculation 1) and the time in which the image $c$ transversed the mirror 3 is 50 seconds, the velocity of the cloud in meters per second will be the result of dividing the horizontal distance by the time in seconds, or 3000 divided by 50 equals 60 meters per second.

Calculation (3) is really no calculation at all, but merely an ascertainment of the graduation on the scale 2 to which the direction line 4 points. According to the showing in Figure 2, the direction line 4 points to "250." Since this is halfway between the graduations "200" (N) and "300" (W), the cloud C is traveling northwest. Consider now

*The details of construction of the nephoscope.*

The mirror 3 consists of a disk of black polished glass. The direction line 4 and the two circles 9 and 10 are inscribed thereon in any suitable manner. The direction line 4 is graduated in centimeters and is 20 cms. long, representing the diameter of the outer circle 10. The inner circle 9 is inscribed at a radius of 5 cms. from the center $x$ of the mirror.

A flanged plate 11 (see Fig. 3) contains the mirror. This plate has a pendent stem 12 with a weight 13 of any suitable type. This weight, cooperating with the gimbal rings 14 and 15, stabilizes the mirror so that it always remains in a substantially horizontal position, no matter how much the box 1 of the nephoscope may sway from side to side. This arrangement is of especial value when the instrument is used aboard ship.

Trunnions 16 on plates 17 secured to opposite sides of the box 1, support the outer ring 14. Trunnions 18 (see Fig. 7) on the inner ring 15 at places 90° from the trunnion 16, support this inner ring in the outer ring. The trunnions 18 have knife edges. A bracket structure 19 (see Fig 3) pendent from the inner ring 15, supports the compass ring or scale 2 which was mentioned in connection with the description of Figure 2. Both rings and the compass scale are fixed so far as rotational movement is concerned. The mirror 3 is revolvable in the hub 20, so that the direction line 4 may be adjusted to coincide with the direction of movement of a cloud image on the mirror.

A bracket 21 is circularly movable in the groove 22 between the scale-ring 2 and mirror 3. The bracket is part of a plate-like structure 23 which is revolubly mounted on the hub 20. It carries the thumb screw 24 by which the quadrant 7 is fixed in place. The quadrant can be moved into any radial position by virtue of its mounting on the revoluble plate 23.

At one side of the quadrant there is a plumb rod 25. It carries an adjustable arm 26 (see Fig. 1) from which the plumb bob 27 is suspended. The plumb bob is used to insure the verticality of the plumb rod 25 so that the mirror 3 may be brought into the true horizontal position should any of its mountings have gotten out of adjustment. The rod 25 is perpendicular to the mirror 3.

The sighting rods 5 and 6 are pivoted at 28 to the bifurcated end 29 of the vertical standard 30. This standard is fixed in a perpendicular position between the highest point of the quadrant 7 and a slight depression 31 in the center of the mirror 3. Simultaneous adjustments of the sighting rods are obtained by moving the head 32 on the vertical standard. Links 33 join the head 32 with the sighting rods. Adjustments of the head, and consequently of the sighting rods, are fixed by means of the thumb screw 34. As mentioned before, the primary sighting rod 6 carries the vernier 8 which is adjustably mounted at 35, as shown in Figure 3.

Blocks 36, mounted at 37 to swing in the horizontal plane and located in opposite corners of the box 1, are used to rigidify the gimbal rings 14 and 15 when the nephoscope is not in use. The blocks are simply swung under the rings so that they in turn are prevented from rocking on their respective trunnions.

While the construction and arrangement of the improved nephoscope as herein described and claimed, is that of a generally preferred form, obviously modifications and changes may be made without departing from the spirit of the invention or the scope of the claims.

I claim:—

1. A nephoscope, comprising a plane mirror for reflecting a cloud image, a rod for establishing a line of sight between the mirror center and a point on the cloud, and a quadrant along which the sighting rod is adjustable, having the natural tangents of the angles formed by the sighting rod and mirror graduated and marked thereon.

2. A nephoscope, comprising a plane mirror for reflecting a cloud image, a rod pivoted at the center of the mirror and for establishing a line of sight between said center and a point on the cloud, a quadrant reaching from one side of the mirror to a place above the center, the quadrant having the natural tangents of the angles formed by the sighting rod and mirror inscribed thereon; and a vernier carried by the sighting rod movable over said inscriptions as the rod is adjusted along the quadrant.

3. A nephoscope, comprising a mirror, companion sighting rods pivoted at the mirror center, the primary rod establishing a line of sight between the center and a point of a cloud the image of which is reflected in the mirror, the secondary sighting rod being a prolongation of the reflection of the primary rod; means for simultaneously adjusting the rods to vary the angles with the mirror, and a quadrant along which the primary rod moves, inscribed with the natural tangents of the angles formed by the primary sighting rod and the mirror.

4. A nephoscope, comprising a mirror forming part of the base of a triangle, a sighting rod forming part of the hypotenuse of a triangle, and a quadrant along which the rod is adjustable, having calibrations in the natural tangents of the angles formed by the rod and mirror, furnishing a factor for the calculation of the length of the triangle base when the height of the vertical side has been determined by other means.

5. A nephoscope, comprising a plane circular mirror with a depression in the center, a quadrant, means supporting the quadrant, a central hub beneath the mirror to which said means extends and which enables circumferential adjustment of the quadrant, a central standard mounted on the zenith of the quadrant and resting in the depression at the lower end, and companion sighting rods pivoted at said lower end, with means on the standard for adjusting both angularly in respect to the standard, one rod moving over calibrations along the quadrant.

6. A nephoscope, comprising a black plane circular mirror with a central depression, a quadrant, means by which the quadrant is carried extending beneath the mirror, a hub with which said means has bearing connection and on which the quadrant is circumferentially adjustable, a central standard pendent from the zenith of the quadrant into the depression with which a conspicuous point of a reflected cloud image should coincide at the beginning of an observation of the travel of the image across the mirror, primary and secondary sighting rods pivoted on the standard at said center, means by which said rods are simultaneously adjustable along the standard, the primary rod being adjustable along the quadrant, the secondary rod being sighted along with the eye toward the center; and graduations on the quadrant marked in the natural tangents of the angles formed by the primary rod with the mirror.

7. A nephoscope, comprising a plane mirror, a quadrant mounted in proximity to one side of the mirror, a plumb rod fixed at the base of the quadrant and rising perpendicularly to the mirror, a bracket on the rod, and a plumb bob pendent from the bracket.

8. A nephoscope, comprising a pair of gimbal rings, a bracket structure carried by the inner ring, a compass scale supported by said structure, bearing means carried by said structure, a plane circular mirror revolubly mounted in said bearing means, said mirror having a central depression, a second bracket extending from said bearing means having a portion movable in a space between the mirror and compass scale edges, a quadrant carried by said second bracket, the bracket extending into bearing engagement with said bearing means to enable circumferential adjustment of the quadrant; a standard pendent from the zenith of the quadrant and resting at the lower end in the depression in the mirror face, a pair of sighting rods having a pivotal mounting upon said standard, means to adjust the sighting rods in respect to the standard, and an adjustable vernier on one of the rods which moves along the quadrant.

9. A nephoscope comprising a mirror, a quadrant rising from the edge of the mirror and extending over the center, a standard pendent from the quadrant and defining a perpendicular in respect to the mirror, a pair of sighting rods of which one is adapted to traverse the quadrant, the other to be used for sighting; means providing a common pivot for the rods upon the standard, and adjustable means by which the positions of the rods are varied simultaneously in respect to each other and to the standard.

10. A nephoscope comprising a circular mirror, means beneath the mirror for supporting the same, a compass scale mounted concentrically of the mirror but leaving an annular space, a quadrant extending over the mirror, and means pivotally mounted on the mirror support and extending through said annular space by which means the quadrant is carried, and by which circular movements of the quadrant support to change the radial positions of the quadrant in respect to the mirror and compass scale are made possible.

ALEXANDER McADIE.